United States Patent [19]

Alfrey

[11] Patent Number: 4,894,831
[45] Date of Patent: Jan. 16, 1990

[54] LONGITUDINALLY PUMPED LASER OSCILLATOR

[75] Inventor: Anthony J. Alfrey, Half Moon Bay, Calif.

[73] Assignee: Spectra-Physics, San Jose, Calif.

[21] Appl. No.: 241,698

[22] Filed: Sep. 7, 1988

[51] Int. Cl.$^4$ ............................................. H01S 3/098
[52] U.S. Cl. ....................................... 372/19; 372/99; 372/41; 372/93
[58] Field of Search .................... 372/69, 70, 95, 41, 372/92, 94, 93, 39, 98, 99, 101, 19

[56] References Cited

U.S. PATENT DOCUMENTS

| 4,433,418 | 2/1984 | Smith ..................................... 372/95 |
| 4,756,003 | 7/1988 | Baer et al. ............................. 372/75 |

OTHER PUBLICATIONS

"Model 380B and Model 380C Ring Dye Laser", Spectra-Physics.
P. Moulton, "An Investigation of the Co:MgF$_2$ Laser System" Oct. 1985, IEEE Journal of Quantum Electronics, pp. 1582–1595.
P. Moulton, "Spectroscopic and laser characteristics of Ti:Al$_2$O$_3$" Jan. 1986, J. Opt. Soc. Am. B, pp. 125–133.
P. Schulz, "Single-Frequency Ti:Al$_2$O$_3$ Ring Laser", Jun. 1988, IEEE Journal of Quantum Electronics, pp. 1039–1044.
A. Sanchez, et al., "Room-Temperature CW Operation of the Ti:Al$_2$O$_3$ Laser" Jun. 4–6, 1986, OSA Topical Meeting pp. 202–207.
A. Sanchez, et al. "Crystal Growth, Spectroscopy, and Laser Characteristics of Ti:Al$_2$O$_3$" Jun. 1988, IEEE Journal of Quantum Electronics pp. 995–1002.
P. Schulz, "Single-Frequency Ti:Al$_2$O$_3$ Ring Laser", Apr. 1987 CLEO Conference.

Primary Examiner—Léon Scott, Jr.
Attorney, Agent, or Firm—Fliesler, Dubb, Meyer & Lovejoy

[57] ABSTRACT

A longitudinally pumped laser is characterized by one segment in which the cavity mode is astigmatic. A solid state medium is mounted within the one segment, so that a volume of the astigmatic cavity mode within the laser medium defines a cavity mode volume. A pump beam is supplied collinearly with the cavity mode through a means causing astigmatic focusing of the pump beam in the laser medium to define a pumped volume within the laser medium. The astigmatically focusing means is mounted according to a precalculated parameter that achieves the best possible average match of the pumped volume with the cavity mode volume, in light of the physical limitations on layout of the resonant cavity. The one segment may be defined by a first off-axis spherical mirror and a second off-axis spherical mirror, with a Brewster-cut solid state medium mounted in between. The astigmatic focusing means is implemented with a third off-axis spherical mirror which focuses the pumping beam through the first off-axis spherical mirror collinearly with the cavity mode into the laser medium. The angle of incidence of the pumping beam on the third off-axis spherical mirror is precalculated to achieve the best average match between the pumped volume and cavity mode volume within the medium.

11 Claims, 8 Drawing Sheets $$P = \frac{(T + 2\alpha_c 1 + \eta)hc\pi^2}{8c\tau\lambda_p\alpha_p\int_0^1 \frac{e^{-\alpha_p x}}{w_{c_x} w_{c_y} w_{p_x} w_{p_y}} Q'(z)\, dz}\ ;$$

WHERE:

$$w_{c_x}^2 = w_{c_{x_o}}^2\left\{1 + \frac{(z-z_{1_x})^2 \lambda_c^2}{\pi^2 w_{c_{x_o}}^4 n_c^2}\right\}\ ; \qquad w_{p_x}^2 = w_{p_{x_o}}^2\left\{1 + \frac{(z-z_{2_x})^2 \lambda_p^2}{\pi^2 w_{p_{x_o}}^4 n_p^2}\right\}\ ;$$

$$w_{c_y}^2 = w_{c_{y_o}}^2\left\{1 + \frac{(z-z_{1_y})^2 \lambda_c^2}{\pi^2 w_{c_{y_o}}^4 n_c^2}\right\}\ ; \qquad w_{p_y}^2 = w_{p_{y_o}}^2\left\{1 + \frac{(z-z_{2_y})^2 \lambda_p^2}{\pi^2 w_{p_{y_o}}^4 n_p^2}\right\}\ ;$$

$$Q'(z) = \int_{-\infty}^{\infty}\int_{-\infty}^{\infty} \frac{e^{-A_x x^2 - A_y y^2}}{1 + Be^{-D_x x^2 - D_y y^2}}\, dx\, dy\ ; \qquad B = \frac{4\delta P_c}{\pi w_{c_x} w_{c_y}}\ ;$$

$$A_x = \frac{2\left(w_{p_x}^2 + w_{c_x}^2\right)}{w_{p_x}^2 w_{c_x}^2}\ ; \qquad\qquad D_x = \frac{2}{w_{c_x}^2}\ ;$$

$$A_y = \frac{2\left(w_{p_y}^2 + w_{c_y}^2\right)}{w_{p_y}^2 w_{c_y}^2}\ ; \qquad\qquad D_y = \frac{2}{w_{c_y}^2}\ .$$

LONGITUDINALLY PUMPED LASER OSCILLATOR

BACKGROUND OF THE INVENTION

1. Field of the Invention

The present invention relates to longitudinally pumped laser oscillators, and particularly to lasers with astigmatism-compensated resonant cavities.

2. Description of Related Art

A variety of laser gain media, such as Ti:Sapphire and Co:MgF$_2$, have been used in longitudinally pumped laser oscillators. In such oscillators, a pump beam and the cavity mode propagate collinearly over the length of the gain media for efficient transfer of pump power to laser beam output power. One embodiment of such oscillators is the form of a folded cavity with a rod-shaped laser media having Brewster-cut faces. The folded cavity induces astigmatism in the cavity mode and the Brewster-cut faces of the laser media rod induce astigmatism in both the cavity mode and the pumping beam within the gain media.

It has been recognized that the astigmatism in the cavity mode can be compensated by proper selection of the Brewster element thickness, and of the focal length and incident angle of the off-axis spherical mirrors in folded cavities (See Kogelnik et al., "Astigmatically Compensated Cavities for CW Die Lasers", IEEE Journal of Quantum Electronics, Vol. QE/8, No. 3, March 1972). The Kogelnik work is directed to compensating the astigmatism induced by off-axis focusing mirrors through the insertion of a Brewster-angled plate into the focused beam. However, this work does not address the additional requirements of pump and cavity mode matching within a Brewster-plate serving as a gain medium.

In longitudinally pumped lasers, contrary to what has been reported by Moulton in "An Investigation of the Co:MgF$_2$ Laser System", IEEE Journal of Quantum lo Electronics, Vol. QE/21, No. 10, October 1985, the pump and laser beams are not identically diffracted within the laser medium due to their differing wavelengths. Therefore, the problem of matching the pumped region within the laser media to the cavity mode volume within the gain medium has not been adequately addressed in the prior art.

This problem has been recognized by Schulz, "Single-Frequency Ti:Al$_2$O$_3$ Ring Laser", presented at CLEO Conference, April 1987. According to Schulz, the output power of a ring laser described in the paper can be increased around ten percent (10%) by inserting a slightly rotated, thin convex focusing lens in the path of the pumping beam outside the resonant cavity of the laser. Rotating the lens induces astigmatism in the pumping beam that improves the match of the pump mode with the cavity mode within the amplifying medium. However, use of the rotated, focusing lens of Schulz also induces a coma effect (tear-shaped distortion) in the pump mode within the medium, resulting in a poor match with the astigmatic cavity mode. In addition, such lenses suffer chromatic dispersion, which could have a slight effect on their practicality over a wide pumping range. As is evidenced by the slight 10 percent gain in output power achieved by Schulz, the rotated lens does not provide a good match of pumped area to cavity mode volume within the gain medium.

It is desirable to obtain the best average match of the pump volume with the cavity mode volume within the gain medium and otherwise to optimize the output power of longitudinally pumped lasers.

SUMMARY OF THE INVENTION

According to the present invention, in a laser having a cavity mode with an astigmatic shape within the laser gain medium and a longitudinal pumping beam, the pumping beam is astigmatically focused in the gain medium so that the pump mode matches the cavity mode, to the best average match.

In one aspect of the present invention, a laser is characterized by one segment in which the cavity mode is astigmatic. A gain medium is mounted within the one segment, so that a volume of the cavity mode within the laser medium defines a cavity mode volume. A pumping beam is supplied collinearly with the cavity mode through a means causing astigmatic focusing of the pumping beam in the gain medium to define a pumped volume within the laser medium. The astigmatically focusing means is mounted according to precalculated pump focus parameters to achieve the best possible average match of the pumped volume with the cavity mode volume accounting for any physical limitations on layout of the resonant cavity and the difference in wavelength between the pumping beam and the cavity mode. According to this aspect, the one segment may be defined by a first off-axis concave mirror and a second off-axis concave mirror, with a rod-shaped Brewster-cut solid state medium, such as Ti:Sapphire, mounted in between. The astigmatic pumping means is implemented with a third off-axis concave mirror which focuses the pumping beam through the first off-axis concave mirror collinearly with the cavity mode into the gain medium. Pump focus parameters, including the angle of incidence of the pumping beam on the third off-axis concave mirror, its focal length, and the location of the pump beam waist in the one segment, are precalculated to achieve the best average match between the pumped region and active region within the gain medium.

According to yet another aspect of the present invention, the output power of a longitudinally pumped solid state medium in the form of a Brewster-cut rod, is optimized by use of a laser medium in which absorption at the pumping wavelength, $\alpha_P$, and the optical path length of the rod, 1, are selected so that $\alpha_P l$ falls within the range of 1.4 to 2.0.

Other aspects of the present invention can be determined by a study of the accompanying figures, the description and the claims.

BRIEF DESCRIPTION OF THE DRAWINGS

FIG. 12 sets out formulas for precalculation of pump focus parameters according to the present invention.

DESCRIPTION OF THE PREFERRED EMBODIMENT

Figure 1:
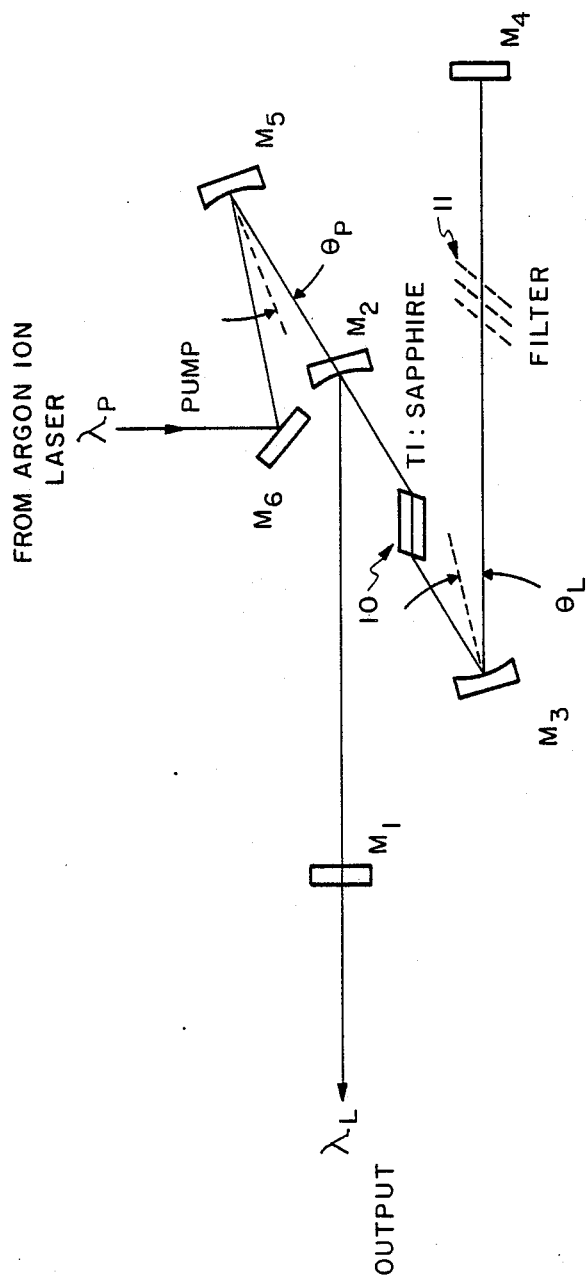
FIG. 1 is a schematic diagram of a laser resonator according to the present invention.
Figure 8:
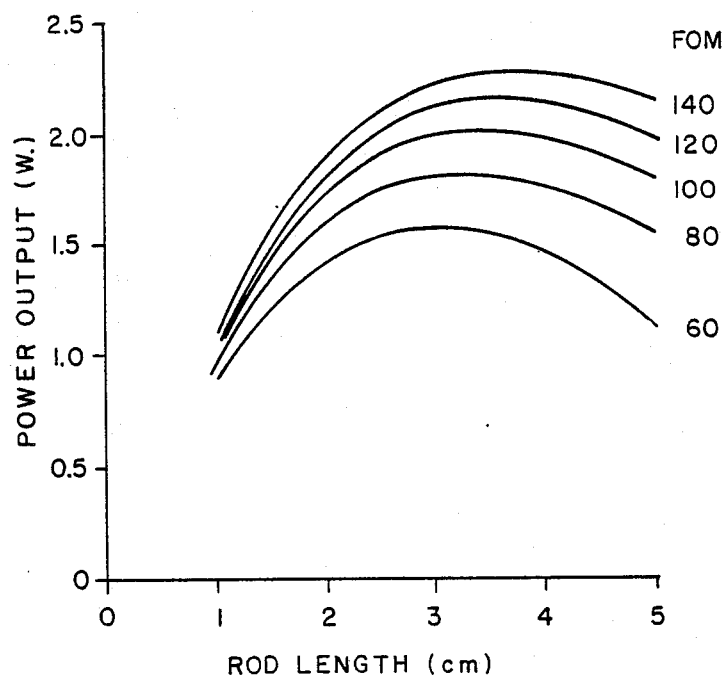
FIG. 8 is a graph illustrating the power output of a laser resonator versus rod length for a variety of Ti:Sapphire media with different figures of merit (FOM) and optimized output mirror transmissions.
Figure 9:
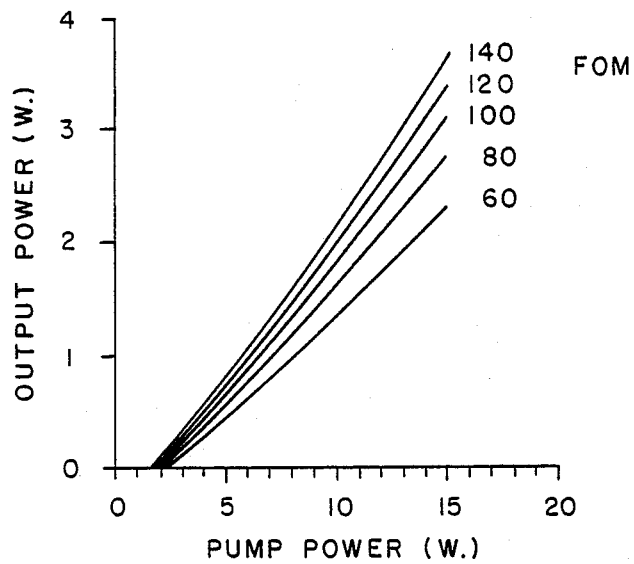
FIG. 9 is a graph of pump power versus output power for a number of gain media with different FOMs for a laser resonator.
Figure 10:
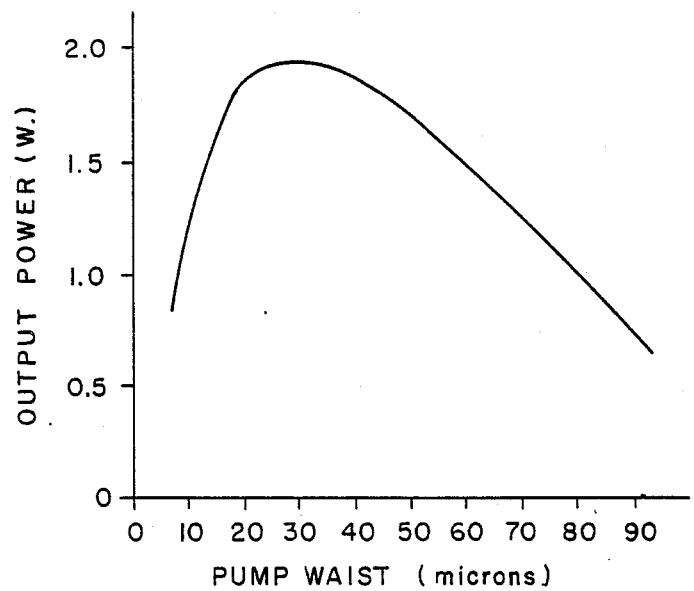
FIG. 10 is a graph of output power versus pump waist, for a laser resonator.
Figure 11:
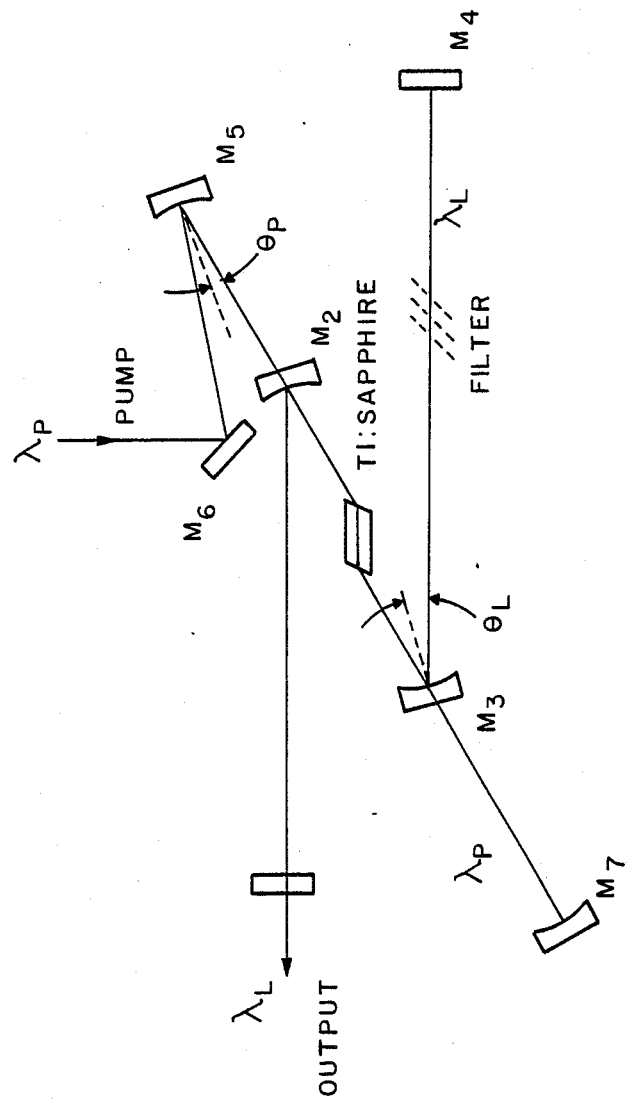
FIG. 11 is a diagram of a resonant cavity according to an alternative implementation of the present invention.

A detailed description of the preferred embodiments of the present invention is provided with reference to the drawings. As illustrated in FIG. 1, one preferred embodiment is a folded cavity, longitudinally pumped CW Ti:Sapphire laser resonator. FIG. 1 illustrates a physical layout of the laser, while FIGS. 2-7 illustrate physical parameters of an oscillator according to the present invention. FIGS. 8-10 illustrate other parameters used in design of longitudinally pumped lasers. FIG. 11 illustrates a physical layout of an alternative embodiment of the present invention. FIG. 12 sets out formulas for calculation of pump focus parameters according to the present invention.

A. Layout of Laser Resonator

FIG. 1 illustrates a longitudinally pumped, folded cavity Ti:Sapphire laser resonator. The resonator consists of flat output coupler M1 with a transmission T equal to 3.5 percent, spherical concave mirror M2 with a radius of 10 cm., spherical concave mirror M3 with a radius of 10 cm. and a flat high reflector M4. Mirrors M2 and M3 are high reflectors at the laser wavelength $\lambda_L$ and transparent at the pump wavelength $\lambda_P$. A Ti:-Sapphire rod, Brewster-cut to a path length of 2 cm. with a crystal "c" axis parallel to the optical electric field, absorption at the pumping wavelength $\alpha_P$ equal to 0.7/cm. and a measured figure of merit (FOM) of 110 is mounted between mirrors M2 and M3.

A longitudinal pump beam is supplied from an argon ion laser. The pump beam is guided off a flat reflector M6 to spherical concave mirror M5. M5 is a high reflector which guides the pump beam through M2 collinearly with the resonant path within the Ti:Sapphire rod 10. For model verification, care was taken to assure that the pump beam and the cavity mode are operating in TEM$_{00}$ mode and because of this requirement, pump powers were limited to 6 watts at 514.5 nanometers, using a SPECTRA PHYSICS 171 argon ion laser. Approximately 5.8 watts at line center with a 3-plate birefringent filter 11 can be obtained at the 20 watt pump level, although the pump beam at this power level operates in a partial doughnut mode and the output beam will mimic this doughnut mode.

The concave mirrors M2, M3 and M5 could be aspherical, such as parabaloidal in equivalent systems. However, spherical mirrors are less expensive due to ease in manufacturing, and are preferred for this reason.

Although calculated optimum output coupler transmission is closer to 7 percent, experimentally it is found that a 5 percent output coupler is closer to optimum. The oscillator, tuned with a birefringent filter 11 over a range of 700-1000 nanometers with two mirror sets, preferably uses a 3.5 percent output coupler because it is easier to obtain a broad band dielectric coating with flat transmission versus wavelength for output couplers having lower transmissions. Additionally, the 3.5 percent output coupler allows lower threshold with a somewhat lower power pump laser.

The resonant path of the laser is characterized by a first segment between mirrors M1 and M2, a second segment between mirrors M2 and M3 and a third segment between mirrors M3 and M4. The first segment in the preferred embodiment is 270 mm. long. On the second segment, the gain medium is mounted 47 mm. from M2, is 20 mm. long and is mounted 47 mm. from mirror M3 for a total optical path length within the second segment of 107 mm. The angle of incidence $\theta_L$ of the beam in the resonant cavity on mirrors M2 and M3 is 15.5 degrees. The third segment between mirrors M3 and M4 is 190 mm. long. The path of the pump beam is characterized by an angle of incidence $\theta_P$ on the mirror M5 equal to 10 degrees, and the distance $d_P$, from mirror M5 to M2 of 72 mm. plus about 12 mm. through M2, defining location of the pump beam waist within the gain medium.

An alternative to mirror M5 is an astigmatically focusing optical system comprising cylindrical lenses. The position and focal lengths of the cylindrical lenses in such a system could be precalculated to achieve a preferred coincidence of the cavity mode volume with the pumped volume in a manner similar to that applied for off-axis concave mirrors.

Manufacturing limitations on the resonator shown in FIG. 1 constrain the designers to select 22.8 cm. as the radius of curvature $R_P$ of mirror M5 at an incident angle of $\theta_P$ equal to 10 degrees with a pump beam waist located in the gain medium.

An optimized oscillator can be achieved with the shorter focal length mirror M5 with a radius of curvature $R_P$ of 12.5 cm., $\theta_P$ equal to 5 degrees and $d_P$ equal to 15 mm. However, in some implementations, the tight mechanical constraints of such systems may be undesirable.

For a given resonant cavity, the parameters $\theta_P$, $R_P$ and $d_P$ are pre-calculated to achieve the best average match of the pumped region within the Ti:Sapphire rod 10 with the cavity mode in the resonant path through the rod 10 or to define otherwise a pumped region that coincides with the volume of the cavity mode in the gain medium to a preferred degree.

Figure 2:
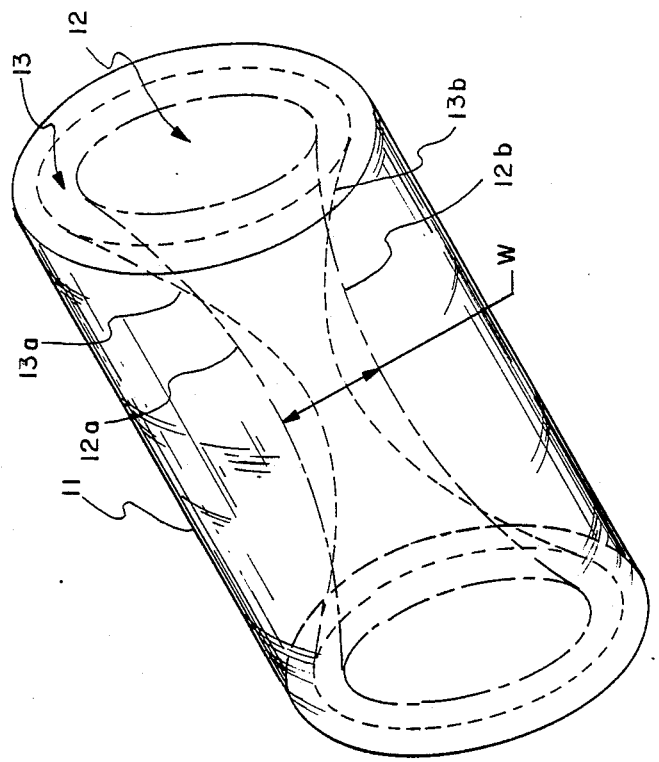
FIG. 2 is a schematic diagram illustrating the cavity mode volume and the pumped volume within a solid state laser medium.

FIG. 2 hueristically illustrates the cavity mode volume 12 and pumped volume 13 within a solid state laser medium 11. The cavity mode volume 12 is identified by lines 12a and 12b and waist $W_C$. The border of the pumped volume 13 is identified by lines 13a and 13b. The figure illustrates heuristically that, because of the difference in wavelength $\lambda_P$ of the pump beam and wavelength $\lambda_L$ of the cavity mode, the shape of the modes within the rod 11 differs. In particular, the pump mode may be focused more sharply than the cavity mode within the rod, causing a slight mismatch between the cavity mode volume and pumped volume. The astigmatism of the pump volume 13 and cavity mode volume 12 is more pronounced than shown in FIG. 2. Dimensions of these volumes are provided in FIGS. 4-6. It is desirable that the pumped volume coincide as closely as possible to the cavity mode volume within the gain medium to optimize power output.

Folded cavities such as that shown in FIG. 1 must be carefully designed to eliminate astigmatism in the output beam at output coupler M1. As can be seen with reference to FIG. 3, astigmatism is essentially eliminated in the output beam at M1 but not in the gain medium rod itself. This layout can be calculated using conventional ray matrix cavity design well known in the art.

Figure 3:
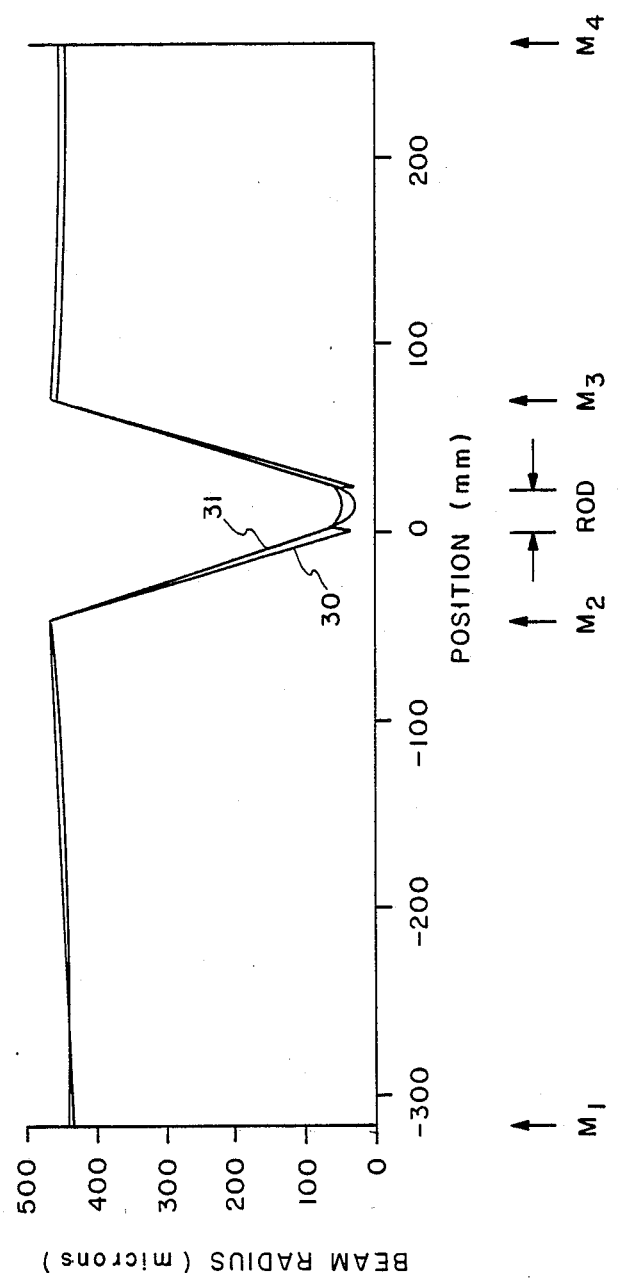
FIG. 3 is a graph illustrating the cavity mode radius in the sagittal and tangential planes along a resonant path in the cavity shown in FIG. 1.

FIG. 3 illustrates the shape of the cavity mode beam within the laser of FIG. 1 in the form of a graph of the cavity mode radius in microns versus position along the resonant path from M1 to M4. The graph includes a first plot 30 of beam radius along the tangential plane of the beam and a second plot 31 of beam radius along the sagittal plane of the beam. The tangential plane is the plane suffering maximum change in radius at the Brewster face of the rod, and the sagittal plane is the plane suffering no change in beam radius at the Brewster face of the rod.

It can be seen that the beam is elliptical over most of its length and that the ellipticity is at its maximum within the rod.

Figure 4:
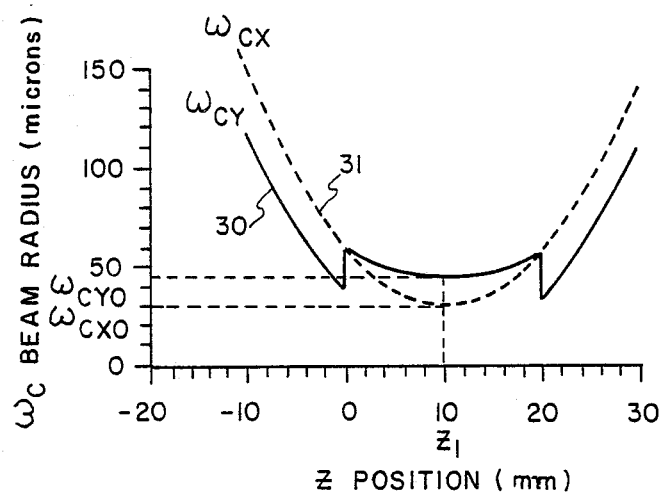
FIG. 4 is a graph illustrating the cavity mode radius in the region of the resonant path through the laser medium.

FIG. 4 is a blowup of the section in FIG. 3 around the rod with the rod faces at positions 0 mm. and 20 mm. The waist defined by tangential (x) and sagittal (y) plane parameters $W_{Cx0}$, $W_{Cy0}$ of the cavity mode occurs inside the rod at the position $Z_1$ of approximately 10 mm.

Figure 5:
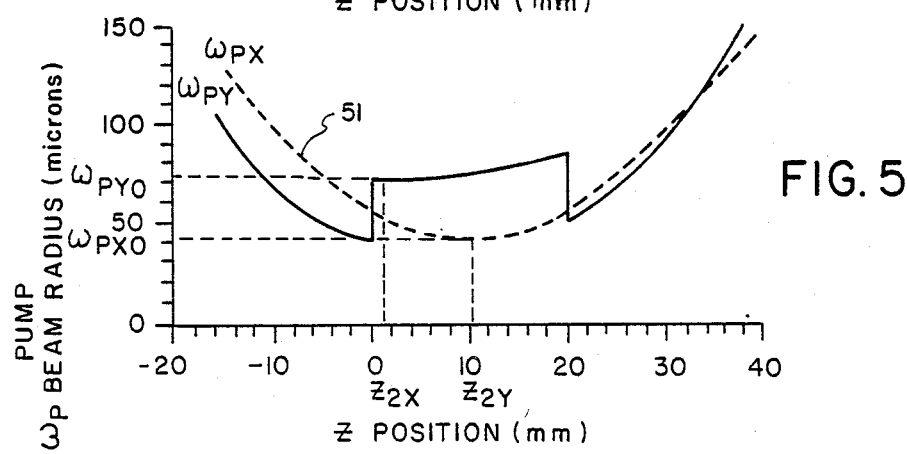
FIG. 5 is a graph illustrating the beam radius of the pump beam in the region of the laser medium according to the implementation of FIG. 1.

FIG. 5 is a plot of the radius of the pump beam in the vicinity of the rod for the layout of FIG. 1. The graph includes a first plot 50 of the tangential plane (x) radius and a second plot 51 of the sagittal plane (y) radius. The waists in the respective planes are defined by ($W_{Px0}$, $Z_{2x}$) and ($W_{Py0}$, $Z_{2y}$).

Figure 6:
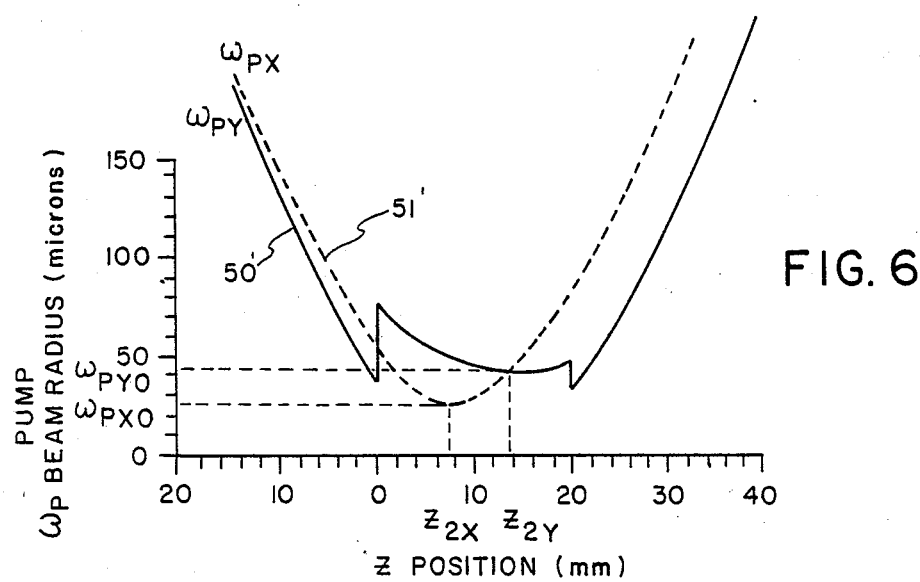
FIG. 6 is a graph illustrating the beam radius of the pump beam for an alternate optimized resonator according to the present invention.
Figure 7:
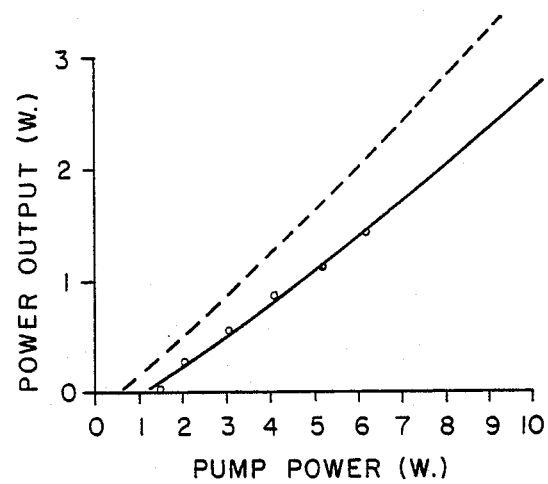
FIG. 7 is a graph illustrating the pump power versus power output of the folded cavity laser resonator illustrated in FIG. 1.

FIG. 6 is a plot of the tangential beam radius 50' and of the sagittal beam radius 51' for the calculated optimum configuration using the 12.5 cm. mirror M5 with waists in the respective planes defined by ($W_{Px0}$, $Z_{2x}$) and ($W_{Py0}$ and $Z_{2y}$).

B. Alternative Laser Layout

As illustrated in FIG. 11, the resonant cavity layout may be improved by mounting a concave mirror M7 matched to the phase front curvature of the transmitted pump beam to recycle pumping power. It has been determined that for a pump power of 20 watts and a recommended $\alpha_{514}l$ (see part "C." below) of 1.5 for a Ti:Sapphire rod, over 4 watts of unused pump power exits the rod. Use of the mirror M7 with the cavity can yield an additional 20 percent increase in output power. Alignment of the recycling mirror M7 is somewhat critical.

C. Design Rules for Longitudinally Pumped Laser

In addition to optimizing the match between the pumped region and the cavity mode within the gain medium, other design rules are important for optimizing output power of the longitudinally laser. In particular, the parameters $\alpha_P$ (adsorption of the pumping beam with the rod), $\alpha_C$ (adsorption of the cavity mode within the rod), the rod length 1, the pump and cavity mode waists $w_C$ and $w_P$, respectively, and the output coupler transmission T, must be optimized for maximum output power. The Ti:Sapphire material is commercially available with a wide range of $\alpha_P$ determined by the weight percent of the titanium oxide, while the figure of merit (FOM), defined as $\alpha_C/\alpha_P$, generally decreases with a higher $\alpha_P$.

Power output of a CW longitudinally pumped laser is plotted versus the rod length and the FOM for a number of Ti:Sapphire media in FIG. 8. For each locus of a points, the output coupler transmission T is adjusted to yield the maximum power output. Pump and signal waists of 50 microns, pump power of 10 watts at 514 nanometers and a value of $\alpha_P$ equal to 0.5/cm. were used in non-astigmatic cavity. Using Equation 8.7-5 of Yariv, "Quantum Electronics," John Wiley, New York, 1975, 2nd Edition; and material data from Moulton, "Spectroscopic and Laser Characteristics of Ti:Al$_2$O$_3$," J.Opt.Soc.Am.B,3, January 1986; the saturation intensity has been calculated to be $2.9 \times 10^5$ W/cm$^2$.

The plot of FIG. 8 illustrates that from a wide range of figure of merit and a fixed $\alpha_P$ of 0.5/cm., the rod length is optimum between about 3 and 4 centimeters. Similar results are obtained for higher or lower $\alpha_P$ from which it is deduced that $\alpha_P$ and the rod length 1 should be selected to yield $\alpha_P l$ in the range of 1.4 to 2 for solid state four-level laser materials including, but not limited to, Ti$^{3+}$: Al$_2$O$_3$, Ti$^{3+}$:YAlO$_3$, CO$^{2+}$:MgF$_2$ and the Nd$^{3+}$ ion operating on the $^4$F$_{3/2}$ to $^4$I$_{11/2}$, $^4$I$_{13/2}$, or $^4$I$_{15/2}$ transitions in a host such as YAG, YLF or YALO. That is, the ordinate value 1=3 cm. corresponds to an $\alpha_P l$ of 1.5 and approximately the same power outputs are obtained for $\alpha_P$ equal to 0.7/cm. and a length of 2.15 cm. For example, for a fixed rod length of 2 cm., a range of concentrations of titanium (0.03 percent to 0.05 percent by weight) corresponding to 0.75/cm. $< \alpha_P <$ 1.0/cm. will yield approximately the optimal power output for a fixed figure of merit. After optimization of $\alpha P1$ over a range of concentrations typically used in CW laser oscillators, the figure of merit will be the critical parameter for determining laser performance.

The dependence of power output on figure of merit is, in some respects, different from that displayed in FIG. 8. In testing materials with different figures of merit, cavity parameters such as rod length, spot size and output coupling fraction are fixed to nominal values while rods of different figures of merit are inserted into the cavity. For instance, when designing a folded cavity as discussed with respect to FIG. 1, in which the rod length and fold mirror curvature fix the angles to correct astigmatism, this method for selecting a gain medium with different figures of merit is important.

In FIG. 9, an output coupler transmission of 3.5 percent, rod length of 2 cm. and $\alpha_P$ equal to 0.7/cm. are assumed and the power output versus pump power and figure of merit is plotted. It can be seen that the power output becomes more independent of figure of merit for large values of figure of merit, since the cavity losses from the output fraction and the mirror coating losses become much larger than the distributed rod loss.

The final parameters that may be selected with some freedom are the pump and cavity beam waists. The minimum spot sizes that can be used in longitudinal pumping of Ti:Sapphire may be somewhat constrained by the mechanical design and alignment ease. In the case of a CW jet dye laser, waists smaller than 10 microns are often used for both the pump and cavity modes. Since a dye jet is much thinner than a Rayleigh length, the pump and cavity modes need not be exactly collinear and the pump spot may be considerably smaller than the cavity mode waist to discourage oscillation of higher order transverse modes. In this case, the cavity can be operated close to the edge of the stability region without undue alignment sensitivity.

In Ti:Sapphire, however, the low emission cross-section and long rod length compared with a jet dye laser, require the close alignment of pump and cavity modes over the entire length of the rod. Therefore, a longitudinally pumped CW Ti:Sapphire cavity is usually operated near the center of the stability region with larger spot sizes (30-100 microns) than typically used for a CW dye laser. However, perfect mode match is not possible over the entire rod length because of differences in wavelengths of the pump and cavity modes. The best power transfer and therefore power output, is obtained with a best average mode match. This is demonstrated in FIG. 10 where the cavity waist size is selected to be 50 microns and the pump waist is varied in a non-astigmatic cavity.

FIG. 10 illustrates a plot of the output power versus pump waist for the fixed cavity waist in a non-astigmatic cavity. For this calculation, the waists are located at the center of the rod, the output coupler transmission is 3.5 percent, the rod length is 2.0 cm., $\alpha_P$ is 0.7/cm. corresponding to an $\alpha_P l$ of 1.4. The most efficient match with the 50 micron cavity waist is a 30 micron pump waist, yielding a pump mode spot size always slightly smaller than the cavity mode spot over the entire length of the rod in a non-astigmatic cavity. Better efficiency is predicted with the pump mode focused slightly closer to the input end of the rod.

For design of a longitudinally pumped solid state laser resonator, the following design rules will yield optimum output power.

1. Select the gain medium material with highest available figure of merit.
2. Rod length is chosen to yield a value of $\alpha_P l$ between 1.4 and 2.0 (for true 4-level laser materials).
3. Conventional ray matrix techniques are used to calculate the astigmatic cavity mode waist and the layout of the resonant cavity.
4. The pump focus mirror incident angle $\theta_P$ and focal length $R_P$ are selected to match the ellipticity of the cavity mode and pump mode through the rod.
5. The astigmatic pump mode waist as set by parameters $\theta_P$ and $R_P$ is located within the rod (by setting $d_P$) and determines the optimum power output based on predictions for a non-astigmatic cavity. Optimum pump waist is found to be slightly smaller than cavity mode waists as illustrated in FIG. 6.
6. Numerically integrate the equation for $P_P$ set out in FIG. 12 for a range of output transmissions T to derive plots of output power $P_C$ versus pump power $P_P$. Select the value for T that optimizes power output for the anticipated range of pump power available. In the equations of FIG. 12, the constants are defined as follows:
   $\eta$ accounts for losses due to imperfect mirror coatings;
   $n_C$ = index of refraction of Ti:Sapphire at the cavity mode wavelength;
   $n_P$ = index of refraction of Ti:Sapphire at the pump mode wavelength;
   $\sigma$ = emission cross-section;
   $\tau$ = flourescent lifetime; and
   S is the saturation parameter.
7. Iterate the pump focus mirror parameters of step 4 to maximize output power calculated in step 6. The entire process should be carried out by computer iteration. The values calculated in FIGS. 4 and 5 were generated by the inventor using a numerical integrating engine on a Macintosh computer, while selecting pump focus parameters manually for each iteration. By using a more sophisticated iteration program as known in the art, a preferred coincidence of the pump beam and the cavity mode within the gain medium can be achieved.

CONCLUSION

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. An apparatus for generating cavity mode, comprising:
   a resonant cavity supporting a cavity mode along a resonant path, the cavity characterized by a segment of the resonant path in which the cavity mode is astigmatic;
   a laser medium mounted within the segment of the resonant path so that a volume of the astigmatic cavity mode within the laser medium defines a cavity mode volume;
   means, mounted with the resonant cavity, for supplying a pump beam having a wavelength different from the cavity mode;
   astigmatic focusing means, mounted at a preselected angle of incidence with the pump beam, for focusing the pump beam along a longitudinal axis to define a pumped volume in the laser medium, such that the best average match of the pumped volume and the cavity mode volume within the laser medium is achieved to thereby maximize output power from the laser medium; and
   means, mounted with the resonant cavity, for abstracting energy from the cavity mode to produce an output beam.

2. The apparatus of claim 1, wherein the laser medium comprises a Brewster-cut sample of laser gain material.

3. The apparatus of claim 2, wherein the laser gain material is Ti:Sapphire.

4. The apparatus of claim 1, wherein a component of the pump beam is transmitted through the laser medium, and further including
   means, mounted outside the segment, for reflecting the component of the pump beam through the laser medium.

5. The apparatus of claim 1, wherein the resonant cavity comprises a first off-axis concave mirror and a second off-axis concave mirror mounted to define the segment so that the cavity mode is astigmatically focused through the laser medium.

6. The apparatus of claim 5, wherein the first off-axis concave mirror reflects the cavity mode and transmits light at the wavelength of the pump beam, and wherein the astigmatic focusing means directs the pump beam through the first off-axis concave mirror.

7. The apparatus of claim 6, wherein the second off-axis concave mirror reflects the cavity mode and transmits a component of the pump beam, and further including means, mounted with the resonant cavity, for reflecting the component of the pump beam back through the laser medium.

8. An apparatus for generating a laser beam, comprising:

a folded resonant cavity supporting a cavity mode along a resonant path, the cavity characterized by a first off-axis concave mirror and a second off-axis concave mirror defining a segment of the resonant path between the first and second off-axis concave mirrors in which the cavity mode is astigmatic;

a laser medium mounted between the first and second off-axis concave mirrors so that a volume of the astigmatic cavity mode within the laser medium defines a cavity mode volume;

means, mounted with the resonant cavity, for supplying a pump beam having a wavelength different from the cavity mode;

a third off-axis concave mirror having a focal length and a position relative to the laser medium, mounted at a preselected angle of incidence with the pump beam to reflect the pump beam through the first off-axis concave mirror and collinearly with the cavity mode through the laser medium, a volume of the pump beam within the laser medium defining a pumped volume, such that the best average match of the pumped volume and the cavity mode volume within the laser medium is achieved to thereby maximize output power from the laser medium; and means, mounted with the resonant cavity, for abstracting energy from the cavity mode to produce the laser beam.

9. The apparatus of claim 8, wherein the laser medium comprises a Brewster-cut sample of laser gain material.

10. The apparatus of claim 9, wherein the laser gain material is Ti:Sapphire.

11. The apparatus of claim 8, wherein the second off-axis concave mirror reflects the cavity mode and transmits a component of the pump beam, and further including:

means, mounted with the resonant cavity, for reflecting the component of the pump beam through the laser medium.

* * * * *